United States Patent
Van Kommer

(10) Patent No.: US 8,457,970 B2
(45) Date of Patent: Jun. 4, 2013

(54) VOICE PORTAL HOSTING SYSTEM AND METHOD

(75) Inventor: Robert Van Kommer, Villars-sur-Glane (CH)

(73) Assignee: Swisscom AG (CH)

( * ) Notice: Subject to any disclaimer, the term of this patent is extended or adjusted under 35 U.S.C. 154(b) by 2297 days.

(21) Appl. No.: 09/835,237

(22) Filed: Apr. 13, 2001

(65) Prior Publication Data

US 2001/0055370 A1    Dec. 27, 2001

(30) Foreign Application Priority Data

May 16, 2000  (EP) ..................................... 00110430

(51) Int. Cl.
*G10L 21/00* (2006.01)
(52) U.S. Cl.
USPC ............................ 704/270; 704/270.1; 704/7
(58) Field of Classification Search
USPC .............. 704/270, 271, 272–276, 270.1, 231, 704/255, 244, 243, 245, 250, 1–10, 251, 704/257; 705/27; 379/88.01, 88.17
See application file for complete search history.

(56) References Cited

U.S. PATENT DOCUMENTS

| | | | | |
|---|---|---|---|---|
| 5,345,501 | A | | 9/1994 | Shelton ............................ 379/89 |
| 5,576,951 | A | * | 11/1996 | Lockwood ...................... 705/27 |
| 5,915,001 | A | | 6/1999 | Uppaluru ................... 379/88.22 |
| 6,029,151 | A | * | 2/2000 | Nikander ........................ 705/39 |
| 6,061,433 | A | | 5/2000 | Polcyn et al. ............. 379/93.12 |
| 6,073,101 | A | * | 6/2000 | Maes ............................. 704/275 |
| 6,088,669 | A | * | 7/2000 | Maes ............................. 704/231 |
| 6,341,264 | B1 | * | 1/2002 | Kuhn et al. .................... 704/255 |
| 6,400,806 | B1 | * | 6/2002 | Uppaluru ................... 379/88.02 |
| 6,487,277 | B2 | * | 11/2002 | Beyda et al. ............... 379/88.01 |
| 6,510,417 | B1 | * | 1/2003 | Woods et al. ................ 704/275 |
| 6,604,075 | B1 | * | 8/2003 | Brown et al. ............. 704/270.1 |
| 6,606,596 | B1 | * | 8/2003 | Zirngibl et al. ............... 704/270 |
| 6,658,414 | B2 | * | 12/2003 | Bryan et al. ...................... 707/9 |
| 6,707,889 | B1 | * | 3/2004 | Saylor et al. ............. 379/88.04 |
| 6,792,086 | B1 | * | 9/2004 | Saylor et al. ............. 379/88.17 |

FOREIGN PATENT DOCUMENTS

| | | |
|---|---|---|
| EP | 0 570 082 A2 | 11/1993 |
| EP | 0 782 318 A2 | 7/1997 |
| WO | WO 99/14743 | 3/1999 |

OTHER PUBLICATIONS

"Voice Response for AIX: Speech Recognition with the BBN Hark Recognizer", chapter 1, pp. 1-16, copyright 1991, IBM Corp.
Ibid., chapter 8, pp. 119-138.

* cited by examiner

*Primary Examiner* — Huyen X. Vo
(74) *Attorney, Agent, or Firm* — McAndrews, Held & Malloy, Ltd.

(57) ABSTRACT

Voice portal hosting system (2) with which a plurality of users (1) in a first voice telecommunication network (10) can establish a connection with a voice equipment (11),
 comprising a memory (26) in which a plurality of interactive voice response applications have been independently uploaded through a second telecommunication network (3) by a plurality of independent value-added service providers (4),
 wherein at least a plurality of said interactive voice response applications uses a common speech recognition module (24) run on said system.

14 Claims, 1 Drawing Sheet

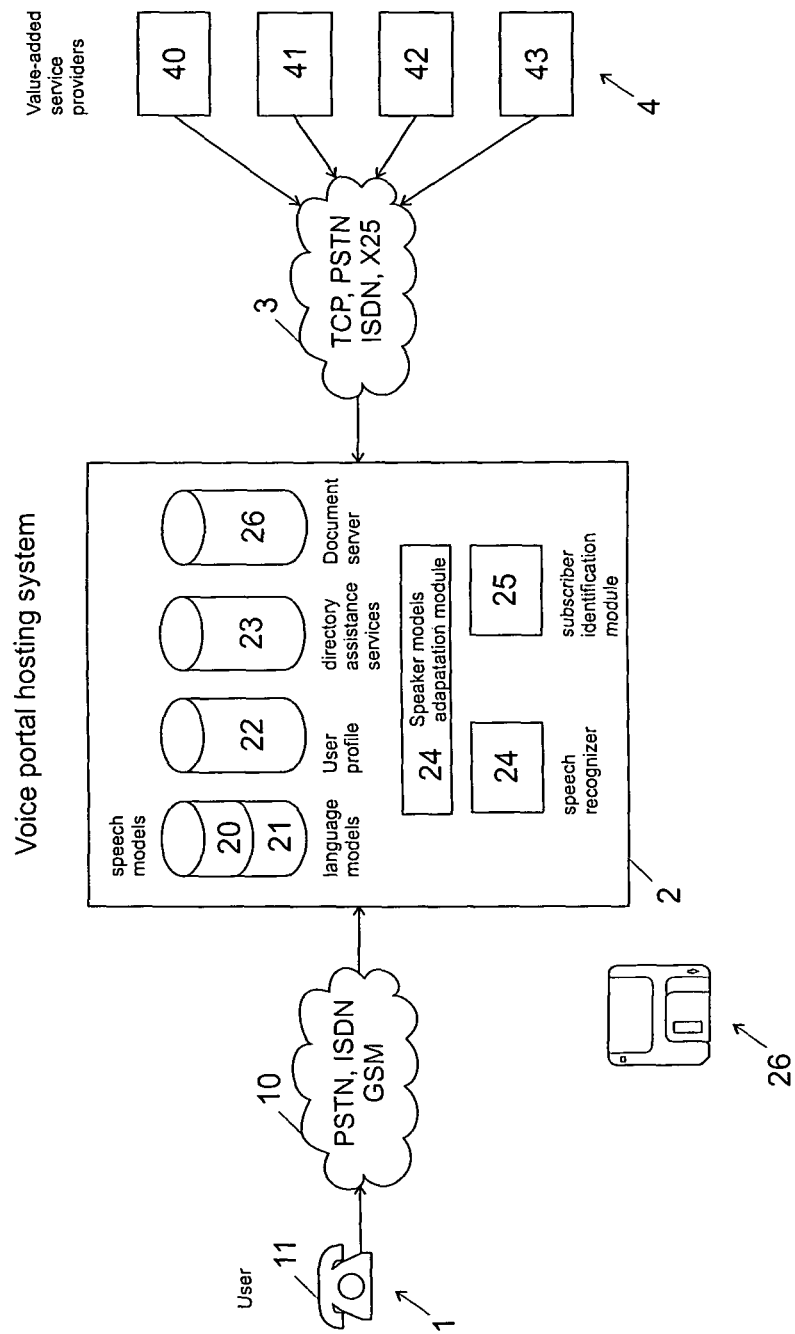

VOICE PORTAL HOSTING SYSTEM AND METHOD

This application claims priority of European application EP00110430.6, filed on May 16, 2000, and whose contents are hereby incorporated by way of reference.

FIELD OF THE INVENTION

The present invention concerns a voice portal hosting system and method. More specifically, the present invention concerns a portal system and method for hosting a plurality of voice applications and services from different external value-added service providers.

RELATED ART

The amount of information available in electronic format is large and growing at a fast rate worldwide. This information may be stored in computers and servers and accessed over communication networks such as e.g. the Internet. A popular portion of the Internet is the World Wide Web that allows for multimedia information such as e.g. text files, images, sound files, etc. to pass between servers and clients using the Hyper-text Transfer Protocol (HTTP).

The clients may be desktop or palmtop computers or even mobile phones and use software programs, e.g. a browser, for displaying the requested information to the users. Even if computers and browsers are extremely widespread nowadays, there are many situations in which, for different kinds of reasons, their use is not appropriate or possible. Especially mobile users are often reluctant to carry a computer or even a palmtop on travel. Moreover, the use of browsers is too cumbersome for many people or for many uses, for example when only a very short piece of information such as, for example, the exact time, sport results or meteorological forecasts, is needed or for simple electronic transactions.

Users usually request information from an http-server using a request entered on a keyboard and interpreted by the browser. The use of keyboards in many situations, like while driving cars, is dangerous if not forbidden. Many requests contain an URL (Uniform Resource Locator) of the server, which for most users is hard to remember.

On the other hand, interactive voice response systems, often called IVR systems or simply voice servers, are known, in which audio information can be stored and accessed by a plurality of users with spoken requests transmitted through the telephone network and interpreted in the voice server. Voice servers have the advantage over http servers that the information can be accessed without any prior knowledge and without any special equipment from any telephone terminal in the world, using a normal phone number which can be found in conventional white or yellow phone books.

IVR systems usually comprise a speech recognition module, often called speech recognizer or simply recognizer, for recognizing and executing commands uttered by the user. Some IVR furthermore include a speaker identification or verification module for identifying or verifying the user's identity. Those systems allow the user to navigate through a so-called "voice menu" and to enter commands and requests which are to be executed by the server.

When compared to conventional human-operated teleservices dedicated to the delivery of goods or services, automated IVR systems allow cost-savings to be achieved by reducing the necessary human resources. Furthermore, those systems offer a better service to users, since they will only rarely hear a busy tone.

A fast and accurate speech recognizer is of unparalleled importance in order to expand the market space of voice servers and voice-based e-commerce applications. In conventional IVR implementations, each service provider operates its own IVR system. IVR systems that are accessed only infrequently by some users don't get a chance to adapt the speech recognition models of those occasional users, so that most speech recognizers used for voice-enabled e-commerce applications use speaker-independent speech recognition algorithms. On a typical word recognition task, speaker-independent speech recognition systems may have twice the error rate of speaker-dependant systems. Consequently, speech recognition performances in known voice servers usually remain poor.

Some IVR systems achieve better performance by using speaker-dependent speech models, which are usually learned during an enrollment session. However, most users would not accept having to spend the time necessary for a different enrollment session with each individual service provider.

Moreover, the direct recognition of the user's billing and delivering address was considered to be, for the time being, out of reach of the current speech recognition technology.

BRIEF SUMMARY OF THE INVENTION

One aim of the invention is to provide a voice portal system and method with improved speech recognition performances over existing methods and systems.

One other aim is to provide a voice portal system and method which avoid the need for an explicit user enrollment in the case of simple services, and a system that offers an implicit adaptation technique that learns the user's habits, his speech accent, and, finally, the language model he uses.

One other aim is to provide a voice portal system and method which use speaker-dependant speech recognition and which may be used even for improving speech recognition performances with users who access a specific voice-enabled service only occasionally and who don't want to spend time for an enrollment session with this service.

One other aim is to provide a voice portal system and method that are easier and cheaper to set up, especially for small service providers, and which allow for good recognition performances even with rarely used services.

In accordance with one embodiment of the present invention, a voice portal hosting system with which a plurality of users in a first voice telecommunication network can establish a connection with a voice equipment comprising a memory in which a plurality of interactive voice response applications have been independently uploaded through a second telecommunication network by a plurality of independent value-added service providers. At least a plurality of said interactive voice response applications use a common speech recognition module run on said system.

The voice portal hosting system may be hosted by a telco operator that provides the intelligent IVR system to a plurality of independent value-added service providers.

One advantage is that user speech and/or language models can be stored in the hosting system and shared between the various service providers. Thus each service provider can benefit from the overall improvement of speech recognition and/or speaker identification performance.

By hosting a plurality of services in a central host, an attractive voice portal offering a comprehensive range of services and proposed goods can be set up.

In a preferred embodiment, the inventive voice portal delivers highly valued engagement services, for example directory assistance service 23, meteorological forecasts etc., in order to keep the user coming back for more and to create a relationship with this user.

BRIEF DESCRIPTION OF THE DRAWING

FIG. 1 shows a diagram of a telecommunication system including one embodiment of the inventive voice portal hosting system.

DETAILED DESCRIPTION

FIG. 1 shows a diagram of a telecommunication system including a voice portal hosting system 2. A plurality of users 1 can establish a voice connection with this voice portal 2 over a public telecommunication network 10, such as a public switched telecommunication network (PSTN), an integrated services data network (ISDN), a mobile telecommunication network, e.g. a GSM network, or a voice-enabled IP-Network (VoIP). The connection is established by selecting the voice portal 2 phone number on a user terminal equipment 11 such as a phone terminal. Preferably, the voice portal phone number is a free business number in the 0800 range or, in a variant embodiment, a charging number in the 0900 range.

The voice portal hosting system includes a dialogue manager (not shown) using a speech synthesizer (not shown) and a speech recognition module 24 (speech recognizer) for establishing a spoken dialogue with the user 1. The dialogue manager answers commands or requests uttered by the user with the requested information or service or by establishing a new connection with an external server. The speech recognition module preferably uses HMM (Hidden Markov Models), adaptive neural networks or hybrids networks. In a preferred embodiment, the speech recognition module comprises Hidden Markov Models built with a toolkit such as the HTK toolkit.

For each user registered in the system, a user profile is preferably stored in a database 22. The user profile may include user-specific information such as name, address, phone and fax numbers, e-mail address, preferred language, preferred delivering address, preferred billing address and/or type (e.g. credit card, check, bill, deposit account etc.), configuration preferences, ordering habits, a priori choices, interests and tastes and so on. If the access to the portal system 2 is secured, the user profile may include security information such as e.g. passwords, biometric parameters, electronic public keys etc.

In a preferred embodiment, the voice portal hosting system 2 is operated by the operator of the telecommunication network 10. In this case, the user profile may include other information known from this operator such as for example solvability.

The system 2 further contains speech (and speaker) models and/or language models for each registered user; those models may be stored in databases 20, 21 or be implicitly contained in the speech recognizer 24.

The system 2 contains a user identification module 25 for determining the identity of the user 1 currently accessing the system. The module 25 may use the authentication CLI or IMSI (International Mobile Subscriber Identification) of the terminal 11 used by the user and/or a user identity entered on a keypad or uttered by the user for determining his identity. If the voice portal hosting system is operated by the operator of the telecommunication network 10, the A-caller identification may be used for that purpose even if this identification has been concealed for other purposes and for other subscribers, without violating the user's data protection rights. In a preferred embodiment, the user identification module 25 identifies in a first step the equipment 11 and uses in a second step a user identification method for determining which user, among the known users of the equipment 11, is currently calling the system. This feature allows for differencing among the several people in a household or in a company who share the same terminal equipment 11. In a variant embodiment, the user 1 is prompted to enter his user name when he calls the system; the declined identity is then checked using known speaker verification methods. The user identification module 25 preferably uses known HMM techniques and speaker models stored in the database 20.

Once the user has been identified by the module 25, his speech and language models as well as his profile can be retrieved from the databases 20, 21 and 22 and used by the dialogue manager (not shown) and by the speech recognizer 24 in order to adapt the dialogue and the speech recognition to each user. By using the fact that speaker-dependent speech recognition is used, a better performance is achieved and thus the quality of service will increase.

The one skilled in the art will understand that, instead of training and storing user-dependant speech models in the database 20, adaptation techniques can be applied. In this case, by using only a small amount of data from a new user, a good speaker-independent model set can be adapted using maximum likelihood linear regression to fit the characteristics of each user. This adaptation can proceed incrementally as adaptation data becomes available (incremental adaptation).

The voice portal hosting system 2 further preferably contains a directory assistance service 23 and/or various other engagement services which may be offered by the operator of the system 2 in order to attract a large number of users, to encourage them to use this system and to let them remember its phone number.

According to the invention, the voice portal hosting system 2 comprises a document server 26, which includes at least a memory, in which a plurality of voice applications can be independently uploaded through a telecommunication network 3 by a plurality of independent value-added service providers 4. Each application may e.g. correspond to an offer or a "voice site" of one provider; the user 1 can access each voice application from the common menu, which is offered to him when he calls the system.

At least several of the voice applications in the memory 26 use the common speech recognizer 24 run on the voice portal hosting system 2. In a preferred embodiment, several of the voice applications in the memory 26 share in the same way the language models 21 and/or at least part of the user profile 22.

The providers can upload a voice application in the system 3 through a telecommunication network, e.g. a TCP/IP network, a public switched telecommunication network (PSTN), an integrated services data network (ISDN), an X25 network, etc. The voice application may include a collection of software objects and/or components, such as executable files, Java-Beans, Corba components etc., which may be installed in the memory 26 and executed by a suitable processor. The voice application may comprise not-compiled or precompiled software modules, which are compiled or interpreted by a common compilation module (not shown) in said voice portal hosting system 2. In a preferred embodiment, the voice application comprises a VoiceXML document, or a set of VoiceXML documents, which form a conversational finite state machine and which are written using the known Voice extensible markup language (VoiceXML) established by the VoiceXML forum. The VoiceXML is a computer language designed to make information accessible via voice and phone and to create audio dialogs that feature synthesized speech, digitalized audio, recognition of spoken and DTMF inputs, recording of spoken inputs, and interactive exchanges. In this embodiment, the document server includes a VoiceXML interpreter for processing the VoiceXML documents requested by the users 1 calling the voice portal hosting system 2.

According to the invention, the recognizer 24 and/or the user identification module 25 make use of a common on-line speech adaptation module 240 for adapting the speech and/or language models, and/or for adapting the HMMs in the recognizer 24 and/or in the speaker identification module 25. This allows the large quantity of training material coming from all the underlying services 40, 41, 42, 43 etc. to be exploited The consequence is that the speech recognition is greatly enhanced by two possible procedures: (i) the personalization of the speech recognition to each user 1 or (ii) simply the increase of the quality of the speaker-independent speech recognition and speaker identification by periodic retraining with the on-field speech data. The goal of the first procedure is to adapt a speaker-independent speech recognition system to a particular user 1 and, in this way, to benefit from the increase of performance offered by speaker-dependent recognition methods. Additionally, the stochastic language model will be stored in a database 21 and updated for each specific user and service access. Therefore the antecedents of the language model can enhance the overall speech recognition result.

As a result, each service provider 40 can benefit for his VoiceXML documents from a recognizer using user speech models which are improved each time one user accesses any one of the different services 23, 40, 41, 42, 43 etc.

In speech recognition, the language model and the acoustic model are related by the Bayes' rule:

$$P(\omega_j I x) = p(x I \omega_j) P(\omega_j) I p(x)$$

where $P(\omega_j)$ is the language model, and $p(x I \omega_j)$ is the acoustic model: the probability density function of the observation sequence x given the class of vocabulary word $\omega_j$. The classification is made based on the estimation of the maximum a posteriori probability $P(\omega_j I x)$.

Preferably, the voice portal hosting system 2 keeps listening to the communication while transferring the call to a specific value-added service provider 4; the purpose is to record the spoken items for the further adaptation of the speech and language models 20, 21.

In a preferred embodiment, users' calls are temporarily recorded in the voice portal hosting system 2, in order to provide for an off-line adaptation of the users' speech and language models. Calls may be erased after a predetermined time length or preferably as soon as they have been used for adapting the models.

Choices and selections made by the users in the voice menu are preferably individually and/or statistically stored, in order to provide for a general and/or user-specific improvement of the arborescence of the voice menu, or to provide for user-specific options and offers. Menu options, which are often selected by a specific user and/or by most users, may be reorganized in order to be more easily accessible. Moreover, the knowledge of the probability of each selection may be used for improving the quality of the speech recognition of each possible option in a menu.

The voice portal hosting system 2 preferably includes a common billing module and a common clearing center (not shown) for collecting and dispatching the collected amounts to the value-added service providers 4. As a result, a plurality of service providers can use shared modules, components, functions and/or objects in the voice portal hosting system 2 for billing the access to their services on a pay-per-minute or pay-per-view basis, and/or for billing the transactions between users 1 and providers 4. The billing can be effected with a common bill prepared by the operator of the voice portal hosting system 2 and grouping all the amounts due by the users to said operator and to the providers 4; if the system 2 is managed by the operator of the telecommunication network 10, the billing can be made with the phone bill sent to the network's users.

In a variant embodiment, at least several users 1 have a deposit account on said voice portal hosting system 2 which can be used for transactions with a plurality of value-added service providers. It is also possible to debit the users' credit card or phone card for each transaction or connection with any of the providers 4. Preferably, the billing address and/or preferences for each user are registered in the user profile database 22.

If the voice portal hosting system 2 integrates an access to the phone directory 23, as shown, the billing and/or delivering address of the user can also be found, checked or completed with this directory.

Using adapted requests, the various voice applications in the memory 26 can preferably access at least part of the content of the common user profile database 22 in order to retrieve e.g. the default billing address and preferences, the default delivery address, the user's preferred language and so on. In a preferred embodiment, at least part of the user data in the database 22 can be updated by a plurality of voice applications from different service providers.

At least some of the voice applications uploaded in the memory 26 are voice-enabled e-commerce applications that allow the voice portal hosting system 2 to "monetize" the relationship with the user 1. The example of a pizza automatic ordering system is a typical revenue-generating interactive voice response application. In that example, the service provider 4 is a pizza firm that pays a small amount per call or per order to the Telco operator and also a monthly fee for the service hosting.

In the following dialogue, the user 1 wishes to access the hosted voice application of the pizza company 40 for ordering a quattro stagioni pizza.

| The residential user 1 | The voice portal hosting system 2 and the pizzeria 40: |
|---|---|
| The user calls the voice portal hosting system 2 where the pizza e-shop is hosted. | The user identification module 25 has identified the user. The speech and language models 20, 21 are loaded. The voice portal hosting system: Welcome, which e-shop would you like to visit? |
| The user: Give me the Blitz-Pizzas. | The user's specific language 21 and |

| The residential user 1 | The voice portal hosting system 2 and the pizzeria 40: |
|---|---|
| | speech 20 models are used to improve the recognition accuracy. |
| | hosted e-shop: Welcome, what is your pizza choice? |
| The user: One Quattro stagioni, please! | The "a priori" choice 22 of this user is known by the system and is given to the language model. |
| | hosted e-shop: Is the following delivering and billing address correct? 44th Bakerstreet in London. |
| The user: That's correct! | The following question is suggested by the user's profile 22. |
| | hosted e-shop: Would you like an additional salad? |
| The user: No thanks! | |
| | hosted e-shop:Anything else? |
| The user: No thanks! | |
| | hosted e-shop: Your order is registered: a qua ttro stagioni pizza which costs 6 and is expected to be delivered in about 15 minutes. |
| The user terminates the communication. | |

The voice portal hosting system 2 may comprise a standard digital computer 2 connected both to a first telecommunication network 10, e.g. a PSTN, ISDN, GSM or TCP/IP-Network, and to a second telecommunication network 3, e.g. TCP/IP, PSTN, ISDN or X25 network, and comprising an internal memory (not shown) in which a computer program product 26 can be directly loaded for performing the method steps of the invention when said product is run on said computer.

The invention claimed is:

1. A voice portal hosting system, allowing a plurality of users to establish a connection with said system using voice equipment for interacting with one or more of a plurality of service providers for ordering a product and/or service, said system comprising:
   means for independently uploading a plurality of interactive voice response applications from said service providers, to said system, via a communication channel in advance of ordering products or services using the system, each of said voice response applications for providing interactive voice response functionality for a corresponding one of said service providers when executed by said hosting system, wherein said interactive voice response applications include an executable component for execution by said hosting system, said executable component comprising at least one of an executable file, a Java Bean, a Corba-component, a compiled software module, and a pre-compiled software module;
   means for storing said plurality of interactive voice response applications;
   a common speech recognition module;
   means for storing a plurality of user-specific speech models and a plurality of language models adapted to specific users for use by the common speech recognition module, wherein the plurality of language models is updated for each specific user and service access;
   a user identification module for identifying a user calling said system via another communication channel;
   means for retrieving the user-specific speech model of the identified user from said plurality of models, wherein the identified user interacts with one or more of said interactive voice response applications, and wherein said one or more interactive voice response applications utilize said retrieved user-specific speech model via said common speech recognition module for recognizing speech of the identified user, and further wherein said common speech models are adaptable during dialogue between said users and any of said interactive voice response applications during ordering of products and/or services from the corresponding providers such that said adapted speech models are thereafter utilized by others of said voice response applications for ordering products and/or services of the corresponding other providers.

2. A voice portal hosting system, intended to be connected to a first voice telecommunication network in order for a plurality of users in said network to establish a connection with said system using voice equipment for ordering products and/or services from one of a plurality of providers, said system comprising:
   a memory in which a plurality of interactive voice response applications providing interactive voice response functionality is stored, each of said applications including an executable component for execution by said hosting system;
   a common speech recognition module;
   means for storing a plurality of user-specific speech models and language models adapted to specific users for use by the common speech recognition module, wherein at least one language model is updated for each specific user and service access;
   a user identification module for identifying a known user or a new user;
   means for retrieving the user-specific speech model of the known user from said plurality of models;
   means for updating said user-specific speech models to the new user without using any training phase; and
   uploading means for independently uploading said plurality of interactive voice response applications, to said system, by a plurality of independent value-added service providers, wherein
   the identified user interacts with one or more of said interactive voice response applications, and wherein said one or more interactive voice response applications utilize said retrieved user-specific speech model via said common speech recognition module for recognizing speech of the known user ordering a product and/or service from one of said providers, and for further adapting said user-specific speech model during said ordering such that said adapted user-specific speech model can thereafter be utilized for ordering a product and/or service from another of said providers, and wherein speaker independent models are used for a new user prior to updating said user-specific speech models to make the new user into a known user.

3. The system of claim 2, wherein each of said interactive voice response applications includes an executable component for execution by said hosting system, said executable component comprising at least one of an executable file, a Java Bean, a Corba-component, a compiled software module, and a pre-compiled software module.

4. The system of claim 2, wherein each of said interactive voice response applications includes an executable component for execution by said hosting system, said executable component comprising at least one of an executable file, a Java Bean, a Corba-component, a compiled software module, and a pre-compiled software module.

5. A method for allowing each of a plurality of value-added service providers to set up an interactive voice response application including an executable component for execution by a voice portal hosting system commonly used by said plurality of value-added service providers, said voice response application for being used by a plurality of users for ordering products and/or services from said providers, said method comprising the steps of:

storing a plurality of user-specific speech models and language models adapted to known users for use by a common speech recognition module, wherein at least one language model is updated for each specific user and service access;

identifying a user calling said system as a known user or a new user;

retrieving the user-specific speech model of the known user from said plurality of models or else retrieving a speaker independent model for the new user and generating a user-specific speech model for the new user without using any training phase;

independently uploading, to said system, said interactive voice response applications which provide interactive voice response functionality;

the identified user interacting with one of said interactive voice response applications; and said one of said interactive voice response applications using said retrieved user-specific speech model or said retrieved speaker independent speech model via said common speech recognition module for executing on said hosting system for recognizing speech of the known user or the new user, respectively for ordering a product or service from one of said providers, such that a user-specific speech model for the new user is created or the retrieved user-specific speech model of the known user is further adapted during said ordering such that said user-specific speech model is thereafter made available for the new or known user to interact with another of said interactive voice applications for ordering a service or product from another of said providers.

6. A method for allowing each of a plurality of independent value-added service providers to set up a corresponding interactive voice response application including an executable component for execution by a voice portal hosting system commonly used by said plurality of value-added service providers and which can be used by a plurality of users, said method comprising the steps of:

storing said interactive voice response applications from said providers on said system for providing interactive voice response functionality, storing a plurality of user-specific speech models and language models, adapted to known users for use by a common speech recognition module, wherein at least one language model is updated for each specific user and service access, identifying a user calling said system as a known user or new user, retrieving the user-specific speech model of the known user from said plurality of models or retrieving a speaker independent model for a new user and adapting a user specific speech model for the new user, and executing one of said voice response applications associated with one of said providers in response to the user calling said system, said executing including interacting with the user via said common speech module using said retrieved user-specific speech model for recognizing the speech of the known user or using said retrieved speaker independent model for the new user, wherein said common speech models are adapted during each dialogue between said users and any of said interactive voice response applications without using any training phase and wherein the user-specific speech model for the user is further adapted during said interacting such that said user-specific speech model is thereafter made available for interacting with any other of said voice response applications associated with another of said providers.

7. The method of claim 6, wherein said interactive voice response applications include an executable component for execution by said hosting system, said executable component comprising at least one of an executable file, a Java Bean, a Corba-component, a compiled software module, and a pre-compiled software module.

8. A system for implementing the method of claim 6.

9. A method for allowing each of a plurality of independent value-added service providers to set up a corresponding interactive voice response application including an executable component for execution by a voice portal hosting system commonly used by said plurality of value-added service providers and which can be used by a plurality of users, said method comprising the steps of:

independently uploading, through a second telecommunication network, said interactive voice response applications to said system for providing interactive voice response functionality, wherein said interactive voice response applications include an executable component for execution by said hosting system, storing a plurality of user-specific speech models and language models, adapted to known users for use by a common speech recognition module, wherein at least one language model is updated for each specific user and service access, identifying a user calling said system as a known user or new user, retrieving the user-specific speech model of the known user from said plurality of models or retrieving a speaker independent model for a new user and adapting a user specific speech model for the new user, executing one or more of said voice response applications in response to the user calling said system, said executing including interacting with the user via said common speech module using said retrieved user specific speech model for recognizing the speech of the known user or using said retrieved speaker independent model for the new user, wherein said common speech models are incrementally adapted during each dialogue between said users and any of said interactive voice response applications using recording speech samples and without using any training phase such that said adapted models are thereafter made available for use by all of said interactive voice response applications of the providers, and wherein said common speech recognition module comprises a common user profile database including user preferences.

10. A voice portal hosting system, intended to be connected to a first voice telecommunication network in order for a plurality of users in said network to establish a connection with said system using voice equipment, said system comprising:

a memory in which a plurality of interactive voice response applications providing interactive voice response functionality is stored, each of said applications including an executable component for execution by said hosting system;

a common speech recognition module;

means for storing a plurality of user-specific speech and language models adapted to specific users for use by the common speech recognition module, wherein at least one language model is updated for each specific user and service access;

a user identification module for identifying a user;

means for retrieving the user-specific speech and language model of the identified user from said plurality of models; and uploading means for independently uploading said plurality of interactive voice response applications in advance, to said system, by a plurality of independent value added service providers, wherein the identified user interacts with one of said interactive voice response applications for ordering a product or service from the provider corresponding to the one of said interactive voice response applications, and wherein said one of said interactive voice response applications utilizes said retrieved user-specific speech and language model via said common speech recognition module for recognizing speech of the identified user during said ordering, and wherein said retrieved user specific speech model is further adapted to the specific user during said ordering from said corresponding service provider such that said further adapted retrieved user-specific speech model is thereafter utilized by any other of said interactive voice response applications for future ordering of products and/or services from the other corresponding service providers.

11. A method for allowing each of a plurality of value-added service providers to set up an interactive voice response application including an executable component for execution by a voice portal hosting system commonly used by said plurality of value-added service providers for selling products and/or services, said voice response application for being used by a plurality of users to order said products and services, said method comprising the steps of:

storing a plurality of user-specific speech and language models adapted to specific users for use by a common speech recognition module, wherein at least one language model is updated for each specific user and service access;

identifying a user calling said system;

retrieving the user-specific speech and language model of the identified user from said plurality of models;

independently uploading, to said system, said interactive voice response applications which provide interactive voice response functionality;

the identified user interacting with one of said interactive voice response applications; and said one of said interactive voice response applications using said retrieved user-specific speech and language model via said common speech recognition module for executing on said hosting system for recognizing speech of the identified user for ordering products and/or services from the provider corresponding to said one of said interactive voice response applications, and wherein, said retrieved user specific speech model is further adapted to the identified user during said ordering such that said further adapted retrieved user-specific speech model is thereafter utilized for ordering of products and/or services from any others of said service providers using their corresponding interactive voice response application(s).

12. A voice portal hosting system, intended to be connected to a first voice telecommunication network in order for a plurality of users in said network to establish a connection with said system using voice equipment, said system comprising:

a memory in which a plurality of interactive voice response applications providing interactive voice response functionality is stored, each of said applications including an executable component for execution by said hosting system;

a common speech recognition module;

means for storing a plurality of user-specific speech models and language models, adapted to specific users for use by the common speech recognition module, wherein at least one language model is updated for each specific user and service access;

a user identification module for identifying a user;

means for retrieving the user-specific speech model of the identified user from said plurality of models; and uploading means for independently uploading said plurality of interactive voice response applications, to said system, by a plurality of independent value-added service providers, wherein the identified user interacts with one of said interactive voice response applications of a correspond one of said providers, and wherein said one of said interactive voice response applications utilize said retrieved user-specific speech model via said common speech recognition module for recognizing speech of the identified user, wherein said retrieved user-specific speech model is further adapted during said interacting and is thereafter made available for use by others of said interactive voice response applications of others of said providers, and wherein said common speech recognition module, said user-specific speech models, and said plurality of interactive voice response applications are all hosted in a single host.

13. A method for allowing each of a plurality of value-added service providers to set up an interactive voice response application including an executable component for execution by a voice portal hosting system commonly used by said plurality of value-added service providers for selling products and/or services, said voice response application for being used by a plurality of users to order said products and services, said method comprising the steps of:

- storing a plurality of user-specific speech and language models adapted to specific users for use by a common speech recognition module, wherein at least one language model is updated for each specific user and service access;
- identifying a user calling said system;
- retrieving the user-specific speech and language model of the identified user from said plurality of models;
- independently uploading, to said system, said interactive voice response applications which provide interactive voice response functionality;
- the identified user interacting with one of said interactive voice response applications of a corresponding one of said providers; and
- said one or more of said interactive voice response applications using said retrieved user-specific speech and language model via said common speech recognition module for executing on said hosting system for recognizing speech of the identified user, wherein said interactive voice response applications include an executable component for execution by said hosting system, and wherein
- said retrieved user-specific speech and language model is adapted during said interacting.

14. The method of claim 13, wherein said adapted retrieved user-specific speech and language model is made available for use by all others of said interactive voice response applications of the other providers.

* * * * *

UNITED STATES PATENT AND TRADEMARK OFFICE
CERTIFICATE OF CORRECTION

| | | |
|---|---|---|
| PATENT NO. | : 8,457,970 B2 | Page 1 of 1 |
| APPLICATION NO. | : 09/835237 | |
| DATED | : June 4, 2013 | |
| INVENTOR(S) | : Robert Van Kommer | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2422 days.

Signed and Sealed this

Thirteenth Day of January, 2015

Michelle K. Lee
*Deputy Director of the United States Patent and Trademark Office*